US012680857B2

(12) United States Patent (10) Patent No.: US 12,680,857 B2
Haas et al. (45) Date of Patent: Jul. 14, 2026

(54) FIELD DEVICE

(71) Applicant: VEGA Grieshaber KG, Wolfach (DE)

(72) Inventors: Jürgen Haas, Oberwolfach (DE); Thomas Ilg, Haslach (DE); Tobias Bader, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 134 days.

(21) Appl. No.: 18/522,767

(22) Filed: Nov. 29, 2023

(65) Prior Publication Data

US 2024/0175739 A1 May 30, 2024

(30) Foreign Application Priority Data

Nov. 30, 2022 (DE) ........................ 10 2022 131 745

(51) Int. Cl.
 *G01F 23/284* (2006.01)
 *G01S 7/02* (2006.01)
 *G01S 13/88* (2006.01)
(52) U.S. Cl.
 CPC ............ *G01F 23/284* (2013.01); *G01S 7/027* (2021.05); *G01S 13/88* (2013.01)
(58) Field of Classification Search
 CPC ........ G01F 23/284; G01S 7/027; G01S 13/38; H01Q 1/225; H01Q 13/24
 See application file for complete search history.

(56) References Cited

U.S. PATENT DOCUMENTS 9,110,165 B2 8/2015 Feisst et al.
11,187,570 B2 11/2021 Feisst 2022/0074783 A1 3/2022 Larsson
2024/0035873 A1* 2/2024 Bergmann ............ G01F 23/284
2024/0186678 A1* 6/2024 Ilg ........................... H01P 1/042
2024/0418557 A1* 12/2024 He .......................... G01S 7/027
2025/0003785 A1* 1/2025 Bergmann ............ G01F 23/284

FOREIGN PATENT DOCUMENTS

DE 102014107781 A1 12/2015
DE 102020133194 A1 6/2022
WO 2011/020668 A2 2/2011
WO 2018/114186 A1 6/2018
WO 2020/103596 A1 5/2020

OTHER PUBLICATIONS

EP23211052.8 Office Action dated Apr. 17, 2024.
DE 10 2022 131 745.5 Search Report dated Aug. 28, 2023.

* cited by examiner

*Primary Examiner* — Christopher E Mahoney
(74) *Attorney, Agent, or Firm* — Wood Herron & Evans LLP

(57) ABSTRACT

A field device includes a housing with a first end distant from a process and a second end close to the process, an electronic system arranged at the first end, and a process connection and a sensor arranged at the second end. The field device defines a first heat conduction path (A), which extends from the second end close to the process to an emitting region, and at least one second heat conduction path (B, B'), which extends from the second end close to the process to the electronic system, wherein the length of the first heat conduction path (A) is shorter than the length of the second heat conduction path (B, B'), and the heat conduction paths (A, B, B') are arranged so that the thermal resistance of the first heat conduction path (A) is lower than the thermal resistance of the second heat conduction path (B, B').

8 Claims, 1 Drawing Sheet

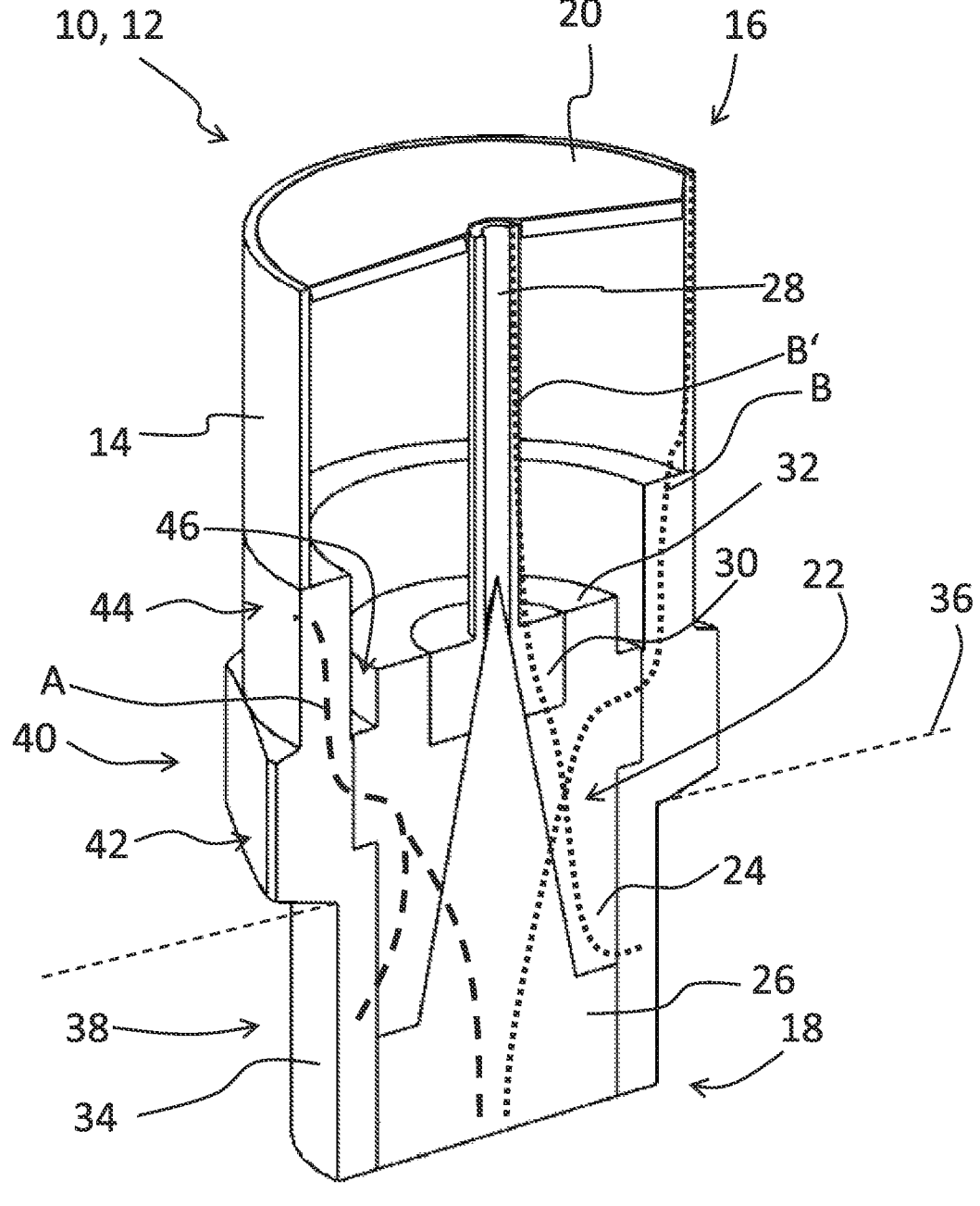

FIELD DEVICE

FIELD OF THE INVENTION

The present invention relates to a field device in the form of a filling level measuring device working in accordance with the radar principle (also referred to as a radar sensor)

CROSS REFERENCE TO RELATED APPLICATION

This application claims priority from Application DE10 2022 131 745.5 filed on Nov. 30, 2022 in Germany. The entire contents of the aforementioned application are incorporated herein by reference in its entirety.

BACKGROUND OF THE INVENTION

Field devices that serve for recording and/or influencing process variables are often used in process automation engineering. Filling level measuring devices, limit level measuring devices and pressure measuring devices with sensor units determining the respective process quantities filling level, limit level or pressure, or process quantities derived therefrom, are examples of such field devices. Here, "field" refers to the area outside of control centers. Thus, field devices may be, in particular, actuators, sensors, data collectors (data loggers) and measuring transducers. Such field devices are frequently connected to higher-level units, e.g. to guidance systems or control systems. These higher-level units serve for controlling, visualizing and/or monitoring processes. The field devices known from the prior art generally have a housing, a sensor unit and an electronics module disposed in the housing. The measured process quantities are usually evaluated and their results, for instance, can be used for generating a switching command and/or a proportional analog or digital output quantity or for displaying physical properties or process quantities.

In part, field devices are also used for monitoring and controlling processes with very high process temperatures. Particularly in the region of hygienic applications, e.g. in the food or pharma industry, such high temperatures are reached when, for instance, a CIP (clean in place) or SIP (sterilization in place) process of the process container and the field device takes place. In these processes, the process containers and the incorporated measurement tech-nology are cleaned and/or sterilized using different cleaning solutions and water vapor at increased temperatures and increased pressure. The high temperatures of, in part, up to 150° C. have to be kept away from a temperature-susceptible electronic system of the field device.

In the field device itself, there is usually arranged an electronic system which has a certain maximum operating temperature that must not be exceeded. Typically, the electronic system may not be permanently heated to more than 90° C. This particularly relates to integrated circuits incorporated in the electronic system and in built-in chips, such as a radar chip, for instance. Therefore, the field device has to be structured such that it can also be used at high operating temperatures and, at the same time, the sensitive electronic system is not heat-damaged.

The heat from the process is primarily introduced into the field device via the process connection or a sensor element directed towards the process. In the case of a radar sensor, the heat may, in addition to the process connection, also be introduced into the field device via an antenna system for emitting the radar signals, i.e. particularly a lens and a horn antenna.

In the prior art, different measures exist, such as spacers, heat sinks, insulated housings and active cooling devices, by means of which the temperature range of use of field devices can be expanded at least over a short term or even permanently.

Spacers or even separators increase the distance between the end close to the process of the field device and an electronic system. Due to the increase of the distance, a temperature increase in the process environment does not, or only in a reduced manner, advance to the electronic system, so that the latter is not damaged. However, this embodiment is perceived to be disadvantageous in that the construction length of the field device increases in a not in-significant manner as the temperature to be expected rises, which reduces the possibilities for applying these field devices.

Alternatively, thermally highly insulated housings may be provided in which an interior space of the housing, in which the electronic system is arranged, for instance, is pro-tected by insulating materials or thermal separation, e.g. by a double-walled housing, from thermal influences. However, such housings require a lot of effort and expense in production and are most frequently significantly larger than conventional housings of comparable field devices.

In addition, it is possible to provide active cooling devices. Such active cooling devices, which work in accordance with the principle of a refrigerating machine, for instance, are technically laborious and expensive in production. Moreover, such active cooling devices have a high energy requirement and therefore cannot be readily integrated into many field devices due to the limited energy budget.

According to the prior art, the electronic system in the simplest case is arranged at such a distance from the process-side end of the field device, that a sufficient amount of heat can be output to the surroundings via the outer housing wall outside of the process, so that the electronic system itself also does not overheat even at high operating temperatures. However, a consequence of this is that the electronic system needs to be arranged very far from the process connection and therefore the field device has particularly large external dimensions.

In these field devices, it is perceived to be a disadvantage that they have a very large structural shape and are therefore somewhat difficult to use, or can not be used at all due to the long structural shape. Therefore, there is a general need for compact field devices that can also be used with high process temperatures.

SUMMARY OF THE INVENTION

The underlying object of the invention is to provide a field device by means of which, even given a low structural height, a sufficient protection of the electronic system against heat is realized.

According to the invention, the object is achieved with the features of the independent claims. Other embodiments and advantages are described in connection with the dependent claims.

A field device according to the invention comprises a housing, wherein the housing has a first end distant from the process and a second end close to the process. Here, portions of the housing are referred to as ends which are orientated in the direction of the process or facing away from the process. In particular, an end includes a portion that extends over up to a third of the length of the housing.

In the housing, an electronic system (in particular a high-frequency electronic system) is arranged at the first end distant from the process. The electronic system is in particular, an evaluation and/or control electronic system. In the case of a radar sensor, the electronic system comprises, in particular, a radar chip or a transducer for generating and receiving radar radiation.

In the housing, a sensor element is further arranged at the second end close to the process. A vibrating fork or pressure measuring cell may serve as a sensor element. In particular, however, a horn antenna and, if necessary, a corresponding lens can be arranged here as a sensor element.

In addition, the housing has at the second end close to the process a process connection, by means of which the field device can be secured on a container. The process connection is a part of the housing and can be configured integrally with the further part of the housing or also separately. The process connection forms the mechanical interface between the field device and the process environment, i.e. the container, in particular.

As was already explained above, heat is introduced from the process environment into the field device in particular via a part of the process connection, which is in connection with a container and in particular protrudes into a container, and/or by a sensor element arranged on the second end close to the process.

According to the invention, the field device has a first heat conduction path, which extends from the second end close to the process to an emitting region. Moreover, the field device has at least one second heat conduction path, which extends from the second end close to the process to the electronic system, wherein the length of the first heat conduction path is smaller than the length of the second heat conduction path. The heat conduction paths are designed such that the thermal resistance of the first heat conduction path is lower than the thermal resistance of the second heat conduction path. In this case, a region of the housing at which the predominant part of the heat introduced into the housing from the process connection and the sensor element is referred to as an emitting region. The emitting region is spaced-apart from the electronic system and spaced-apart from the first end distant from the process and the second end close to the process.

In particular, the thermal resistance of the first heat conduction path is lower by 50%, and preferably by 70%, and particularly preferably 90%, than the thermal resistance of the at least one second heat conduction path.

Accordingly, the field device is designed such that despite the emitting region being close to the heat source (i.e. the container), the heat can be discharged via the emitting region and the electronic system is thus not heated above the allowable temperature.

The size of the field device, i.e. the distance between the electronic system and the second end close to the process, can remain small. The heat is effectively output from the heat source to the emitting region and finally to the surroundings. The comparatively large outer surface of the emitting region as a part of the housing here produces an effective convection.

A possibility of passively cooling the field device is thus produced. According to the present application, passive cooling is understood to mean that the cooling process takes place even without adding external energy. In the present case, the cooling takes place by trans-porting away in a targeted manner heat introduced into the field device via the first heat conduction path to the emitting region and the output of the heat by emission and convection. A particularly simple and compact structure, which can also be realized in an inexpensive manner, is obtained by a passive cooling.

In a practical embodiment of the field device, the emitting region is arranged on the process connection. In particular, the emitting region is formed integrally with the process connection.

The emitting region can be a neck, which is arranged on the process connection. In this case, a pipe section arranged on the process connection is referred to as a neck. The neck can be integrally formed with the process connection. Alternatively, the neck and the process connection may also be configured as two parts, or the neck is a part of the housing.

In particular, the emitting region is arranged on a side of the process connection facing away from the process. In particular, the emitting region is arranged outside of a contact portion of the housing, wherein the contact portion is provided for arrangement in a container or is in direct contact with the container. The contact portion can be, for instance, a threaded portion by means of which the field device is connected to a container. The emitting region is arranged in an, in particular, spaced-apart manner from the contact portion.

In the case of a process connection with a contact portion and an outer portion, wherein the outer portion is arranged outside of the container in an installation position of the field device on a container, the outer portion has, in particular, an engagement portion for a tool. The emitting region is then arranged, in particular, directly adjacent to the engagement portion. Alternatively, the emitting region can at the same time be an engagement portion for a tool.

In another practical embodiment, the process connection has a two-part configuration and has a contact portion and an outer portion. In this case, the contact portion is connected to the container and a heat source; in particular, it is a threaded portion. In the installation position of the field device, the outer portion is located outside of the container. The contact portion is formed, in particular, from a first material that is less heat-conductive, such as stainless steel or plastics, and the engagement portion from a second material that is more heat-conductive, such as aluminum or brass. In addition, a thermally insulating material may be arranged between the contact portion and the engagement portion.

Moreover, an intermediate member (also referred to as a pressure member), which extends from the second end close to the process in the direction of the first end distant from the process, can be arranged in the housing, and wherein the intermediate member is arranged at its end facing away from the process in a spaced-apart manner from the emitting region. That means that a gap is formed between the intermediate member and the emitting region. This gap may be additionally filled with a thermally insulating material. The intermediate member may be a separate part or configured integrally with the process connection or the housing.

In particular, the intermediate member also serves for attaching a waveguide, such as a hollow tube, in the case of a radar measuring device. For this purpose, the intermediate member has, particularly on the end face facing away from the process, an annular projection, wherein the outer diameter of the annular projection is smaller than the outer diameter of the adjacent portion of the intermediate member. The enclosed surface of the annular projection serves, in particular, for accommodating and attaching a waveguide. The gap causes a thermal decoupling between the waveguide and the housing or emitting region. Particularly if the connection of the waveguide is at the same level as the emitting region. A thermally insulating layer may additionally be provided between the intermediate member and the waveguide.

If an intermediate member is provided, it may, on the one side, be a part of the first heat conduction path by conducting heat from the process connection and/or the sensor element (e.g. the lens) to the emitting region. On the other side, the intermediate member may at the same time serve as a horn antenna for forwarding and shaping radar radiation.

In particular, the intermediate member is made from brass, aluminum, copper or titanium.

Moreover, the intermediate member may have at the end face facing away from the process an at least partially peripherally extending depression or groove, which further counteracts a heat transfer to the waveguide.

In addition, in order to improve the heat transfer, a heat conductive layer may be arranged between the process connection and the intermediate member, so that the transition resistance is as small as possible. In particular, the heat conductive layer may be heat conductive pads and/or heat conductive paste.

In particular, the field device is a radar measuring device for measuring a filling level. In that case, the radar measuring device has an electronic system with a radar chip (transducer) at the first end distant from the process and a sensor element (antenna and, in particular, additionally a lens) at the second end close to the process. The radar measuring device has a waveguide, wherein the waveguide extends from the sensor element (antenna and, in particular, lens) to the electronic system (radar chip). In particular, the waveguide is a part of the second heat conduction path up to the electronic system. In particular, the waveguide is arranged in a contactless manner to the housing, i.e. the waveguide is not in direct contact with the housing. The waveguide is connected only indirectly, in particular via the intermediate member, to the housing. In addition, a thermally insulating material can be arranged between the waveguide and the intermediate member, such as a layer of plastic, for instance, and/or notches and gaps are formed there. Moreover, the contact surface between the waveguide and the intermediate member is, in particular, minimized. The transition resistance between the intermediate member and the waveguide may also be reduced by a threaded portion, by means of which the waveguide is attached to the intermediate member.

In addition, the waveguide may be a component consisting of a thermally insulating material, which is metallized inside. For example, the waveguide may consist of a thermally stable plastic or a ceramics. Thus, a thermal conduction along the waveguide can be reduced further.

In order to guide the heat from the end close to the process to the emitting region, the wall thickness of the housing is in the emitting region at least twice as large, and preferably at least 3.5 times as large, as the wall thickness of the housing portion adjacent in the direction of the first end distant from the process.

Alternatively or additionally, the wall thickness of the housing is in the emitting region at least three times and preferably four times as large as the wall thickness of the waveguide.

In particular, the housing surrounds the waveguide on the outside, and the housing has a greater diameter than the waveguide. Here, the effective cross-sectional surface area of the emitting region, i.e. the cross-sectional surface area directed perpendicularly to the thermal flow, is greater than the effective cross-sectional surface area of the waveguide.

In particular, the effective cross-sectional surface area of the housing in the emitting region is at least 10-times as large, and preferably at least 50-times as large, as the effective cross-sectional surface area of the waveguide.

In particular, the wall thickness of the housing decreases from the second end close to the process to the first end distant from the process in at least one region. Preferably, the decrease takes place directly on the side of the emitting region facing away from the process, in particular at the transition from the process connection to another housing portion. In particular, the wall thickness decreases in a sudden manner.

Moreover, an isolating structure can be arranged between the emitting region and the portion of the housing, which is adjacent in the direction of the end distant from the process. Thus, the housing may have many parts, or an insert member may be arranged in the housing. The insulating structure may be a gap (filled or evacuated) or also an insert member, in particular made of a thermally insulating material, e.g. plastics.

In particular, the thermal resistance of the housing in the emitting region amounts to a maximum of half and preferably to a maximum of $\frac{1}{3}$ of the thermal resistance of the housing portion adjacent in the direction of the first end distant from the process. The emitting region is, in particular, made of stainless steel, aluminum, brass, titanium or copper. The housing adjacent thereto may be made of stainless steel or plastic.

Furthermore, the thermal resistance of the housing in the emitting region in particular amounts to a maximum of $\frac{1}{10}$, and preferably a maximum of $\frac{1}{50}$, of the thermal resistance of the waveguide.

Alternatively or additionally, the thermal resistance of the intermediate member amounts to a maximum of $\frac{1}{100}$, and preferably to a maximum of $\frac{1}{270}$, of the thermal resistance of the waveguide and/or is a maximum of half the size, and preferably 1/3.5, of the thermal resistance of the process connection. In particular, the intermediate member is made from aluminum or brass.

The heat dissipation via the emitting region can be further improved if the housing has, in the region of the emitting region, cooling structures on the outside. Here, cooling fins, a heat sink and/or a heat exchanger may be arranged or configured on the outside of the housing.

Other practical embodiments are described below in connection with the Figure. In the drawing:

BRIEF DESCRIPTION OF THE DRAWING

FIG. 1 shows a field device in a schematic representation in a cross section.

DETAILED DESCRIPTION OF THE DRAWING

FIG. 1 shows a field device 10, wherein the field device 10 here is a radar measuring device 12. The field device 10 has a housing 14, which has a first end 16 distant from the process and a second end 18 close to the process.

At the first end 16 distant from the process of the housing 12, an electronic system 20 is arranged within the housing 12.

At the second end 18 close to the process, a multi-part sensor element 22 is arranged, wherein the horn antenna formed by an intermediate member 24 and a dielectric lens 26 are arranged here as a part of the sensor element 22. The intermediate member 24, as shown in FIG. 1, may be configured as a separate part or alternatively be integral with the housing 14.

A hollow tubular waveguide 28 extends between the sensor element 22 and the electronic system 20 in the longitudinal direction of the housing 12. Via the waveguide 28, emitted radar beams are coupled by the electronic system 20 into the lens 26; after reflection, the radar beams are inversely conducted by the waveguide 28 to the electronic system 20. At its end close to the process, the waveguide 28 has a base 30, by means of which the waveguide 28 is screwed into a corresponding depression in the intermediate member 24. For this purpose, the intermediate member 24 has an annular projection 32.

Moreover, the housing 14 has at the second end 18 close to the process a process connection 34, which serves for securing the housing 14 on a container. Here, the top side of the container is visualized by the dashed line 36.

In the illustrated embodiment, the process connection 34 has a contact region 38, which in this case is a threaded portion. The contact region 38 is in contact with a container. At the side of the contact region 38 facing away from the process, the process connection 34 has an outer region 40 located outside the container. In the embodiment shown at present, the outer region 40 has an engagement portion 42 and an emitting region 44. The engagement portion 42 is formed as a hexagon and serves, for instance, as an engagement surface for a tool for screwing in the field device 10 into a container.

The emitting region 44 is arranged at the end facing away from the process of the process connection 34 and directly adjacent to the engagement portion 42. The emitting region 44 is formed as a neck integrally with the process connection 34.

In the following, the heat dissipation in the field device 10 is described based on the Figure.

Heat is introduced in the field device particularly via the process connection 34 and in this case primarily via the threaded portion and the lens 26.

The housing 14 with the sensor element 22, the process connection 34 and the waveguide 28 is designed such that the thermal resistance of a first heat conduction path A from the second end 18 close to the process to the emitting region 44 is smaller than the thermal resistance of at least one second heat conduction path B from the second end 18 close to the process to the electronic system 20. The length of the first heat conduction path A is smaller than the length of the second heat conduction path B.

A heat conduction path B from the process connection 34 or the lens 26 via the intermediate member 24, the emitting region 44 and the following housing portion of the housing 14, or a heat conduction path B' from the process connection 34 or the lens 26 via the intermediate member 24 and the waveguide 28, in each case to the electronic system 20, are considered a second heat conduction path B.

In order to conduct the heat to the emitting region 44 if possible, the intermediate member 24 has a high thermal conductivity. The intermediate member 24 is in direct contact with the engagement portion 42, which transmits the heat onto the emitting region 44. If necessary, a heat conductive pad or heat conductive paste can be used in order to improve the transition resistance between the contact region 38 and the intermediate member 24 or between the lens 26 and the intermediate member 24. Also, the transition between the engagement portion 42 and the intermediate member 24 can be improved by a heat conductive pad or a heat conductive paste.

At the transition from the emitting region 44 to the housing 14 adjacent thereto, the wall thickness of the housing 14 suddenly decreases. Because of the low wall thickness, the housing 14 has an increased thermal resistance at the portion adjacent to the emitting region 44.

The waveguide 28 is screwed into the intermediate member 24, so that the heat transfer between the waveguide 28 and the intermediate member 24 is minimized. In addition, the waveguide 28 has a small wall thickness with an increased thermal resistance. The waveguide 28 is not in direct contact with the housing 14.

In order to also thermally decouple the waveguide 28 from the housing 14 and the emitting region 44, a gap 46 is formed between the housing 14 and the annular projection 32 of the intermediate member 24, which accommodates the waveguide 28.

REFERENCE SIGNS LIST

10 Field device
12 Radar measuring device
14 Housing
16 First end distant from the process
18 Second end close to the process
20 Electronics
22 Sensor element
24 Intermediate member
26 Lens
28 Waveguide
30 Base
32 Annular projection
34 Process connection
36 Container surface
38 Contact region
40 Outer region
42 Engagement portion
44 Emitting region
46 Gap
A First heat conduction path
B Second heat conduction path
B' Second heat conduction path

The invention claimed is:

1. A field device with a housing, wherein the housing has a first end distant from the process and a second end close to the process, and wherein in the housing at the first end distant from the process an electronic system is arranged, and wherein in the housing at the second end close to the process a sensor element is arranged, and wherein the housing has at the second end close to the process a process connection, wherein the field device has a first heat conduction path, which extends from the second end close to the process to an emitting region, and at least one second heat conduction path, which extends from the second end close to the process to the electronic system, wherein the length of the first heat conduction path is smaller than the length of the second heat conduction path, and wherein the heat conduction paths are designed such that the thermal resistance of the first heat conduction path is lower than the thermal resistance of the second heat conduction path, wherein the emitting region is arranged on the process connection and is integrally formed with the process connection.

2. The field device according to claim 1, wherein—the emitting region is arranged on a side of the process connection facing away from the process.

3. The field device according to claim 1, wherein—the process connection has a two-part configuration and has a contact portion and an outer portion.

4. The field device according to claim 1, wherein—an intermediate member, which extends from the second end close to the process in the direction of the first end distant from the process, is arranged in the housing, and wherein the intermediate member is arranged at its end facing away from the process in a spaced-apart manner from the emitting region.

5. The field device according to claim 1, wherein—the field device is a radar measuring device for measuring a filling level, wherein the radar measuring device has a hollow conductor, wherein the hollow conductor has no direct contact to the housing.

6. The field device according to claim 1, wherein a) the wall thickness of the housing is in the emitting region at least twice as large as the wall thickness of the housing portion adjacent in the direction of the first end distant from the process, b) the wall thickness of the housing is in the emitting region at least four times as large as the wall thickness of the hollow conductor, and/or c) the effective cross-sectional surface area of the housing is in the emitting region at least 10-times as large as the effective cross-sectional surface area of the hollow conductor.

7. The field device according to claim 1, wherein—the wall thickness of the housing decreases from the second end close to the process to the first end distant from the process in at least one region.

8. The field device according to claim 1, wherein a) the thermal resistance of the housing in the emitting region amounts to a maximum of $\frac{1}{3}$ of the thermal resistance of the housing portion adjacent in the direction of the first end distant from the process, b) the thermal resistance of the housing in the emitting region amounts to a maximum of $\frac{1}{10}$ of the thermal resistance of the hollow conductor, and/or c) the thermal resistance of the intermediate member amounts to a maximum of $\frac{1}{100}$ of the thermal resistance of the hollow conductor and/or is a maximum of half the size of the thermal resistance of the process connection.

* * * * *